(12) United States Patent
Sasaki et al.

(10) Patent No.: US 11,692,330 B2
(45) Date of Patent: Jul. 4, 2023

(54) WORK MACHINE

(71) Applicant: KOMATSU LTD., Tokyo (JP)

(72) Inventors: Makoto Sasaki, Tokyo (JP); Hiroaki Tanaka, Tokyo (JP); Masayoshi Nomoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/260,327

(22) PCT Filed: May 10, 2019

(86) PCT No.: PCT/JP2019/018722
§ 371 (c)(1),
(2) Date: Jan. 14, 2021

(87) PCT Pub. No.: WO2020/026552
PCT Pub. Date: Feb. 6, 2020

(65) Prior Publication Data
US 2021/0292996 A1    Sep. 23, 2021

(30) Foreign Application Priority Data

Jul. 31, 2018    (JP) ................................. 2018-144543

(51) Int. Cl.
| | |
|---|---|
| *E02F 9/16* | (2006.01) |
| *B62D 33/06* | (2006.01) |
| *E02F 3/36* | (2006.01) |
| *E02F 3/32* | (2006.01) |

(52) U.S. Cl.
CPC .......... *E02F 9/163* (2013.01); *B62D 33/0617* (2013.01); *E02F 3/3695* (2013.01); *E02F 3/32* (2013.01)

(58) Field of Classification Search
CPC ...... B62D 33/0617; E02F 3/32; E02F 3/3695; E02F 9/163
See application file for complete search history.

(56) References Cited

U.S. PATENT DOCUMENTS

| | | | |
|---|---|---|---|
| 6,568,746 B2 * | 5/2003 | Sakyo | ..................... B66C 13/54 296/190.08 |
| 7,581,783 B2 * | 9/2009 | Mori | .................. B62D 33/0617 296/205 |
| 2002/0149232 A1 * | 10/2002 | Sakyo | ..................... B66C 13/54 296/190.08 |
| 2002/0153748 A1 * | 10/2002 | Sakyo | .................. B62D 27/023 296/190.08 |
| 2006/0017308 A1 | 1/2006 | Kojima et al. | |
| 2007/0035160 A1 | 2/2007 | Murakami | |

(Continued)

FOREIGN PATENT DOCUMENTS

| | | |
|---|---|---|
| CN | 1724819 A | 1/2006 |
| CN | 2911021 Y | 6/2007 |
| CN | 204781067 U | 11/2015 |

(Continued)

*Primary Examiner* — Saul Rodriguez
*Assistant Examiner* — Brendan P Tighe
(74) *Attorney, Agent, or Firm* — Faegre Drinker Biddle & Reath LLP

(57) ABSTRACT

The front pillar disposed on the second side face of the cab is located behind the front pillar disposed on the first side face of the cab. The boom mounting bracket and the front pillar overlap each other in a side view.

12 Claims, 8 Drawing Sheets

(56) References Cited

U.S. PATENT DOCUMENTS

| | | |
|---|---|---|
| 2016/0031494 A1 | 2/2016 | Kinoshita et al. |
| 2019/0112787 A1* | 4/2019 | Hunold .................. F15B 21/08 |

FOREIGN PATENT DOCUMENTS

| CN | 105317068 A | | 2/2016 | |
|---|---|---|---|---|
| CN | 108100054 A | | 6/2018 | |
| JP | 2005-335474 A | | 12/2005 | |
| JP | 2006-037360 A | | 2/2006 | |
| JP | 2006-327282 A | | 12/2006 | |
| JP | 2006327282 A | * | 12/2006 | |
| JP | 2007-46396 A | | 2/2007 | |
| JP | 2007-216957 A | | 8/2007 | |
| JP | 2007-269195 A | | 10/2007 | |
| JP | 2009-137393 A | | 6/2009 | |
| JP | 2009137393 A | * | 6/2009 | ............. E02F 9/163 |
| JP | 2010-83338 A | | 4/2010 | |

\* cited by examiner

WORK MACHINE

TECHNICAL FIELD

The present disclosure relates to a work machine.

BACKGROUND ART

For example, Japanese Patent Laying-Open No. 2007-216957 (PTL 1) discloses a cab to be used in a work machine such as a hydraulic excavator. The cab disclosed in this publication is provided with pillars including a pair of front pillars disposed on both sides, respectively and a pair of rear pillars disposed on both sides, respectively.

CITATION LIST

Patent Literature

PTL 1: Japanese Patent Laying-Open No. 2007-216957

SUMMARY OF INVENTION

Technical Problem

In order to enhance the workability of an operator in a cab of a work machine, it is required to further improve the front visibility including the oblique front visibility.

In addition, since the strength is also required by the cab, it is preferable to prevent the cab from tilting when subjected to a large load from the lateral side.

An object of the present disclosure is to provide a work machine capable of enhancing the workability by improving the front visibility of an operator in the cab and preventing the cab from tilting when subjected to a large load from the lateral side.

Solution to Problem

The work machine of the present disclosure includes a work implement, a bracket, and a cab. The bracket supports the work implement. The cab has a first side face and a second side face facing the first side face and located closer to the work implement. The cab includes a first front pillar and a second front pillar. The first front pillar is disposed on the first side face. The second front pillar is disposed on the second side face and located behind the first front pillar. The bracket and the second front pillar overlap each other in side view.

Advantageous Effects of Invention

According to the present disclosure, it is possible to enhance the workability of the work machine by improving the front visibility of an operator in the cab and preventing the cab from tilting when subjected to a large load from the lateral side.

DESCRIPTION OF EMBODIMENTS

Figure 1:
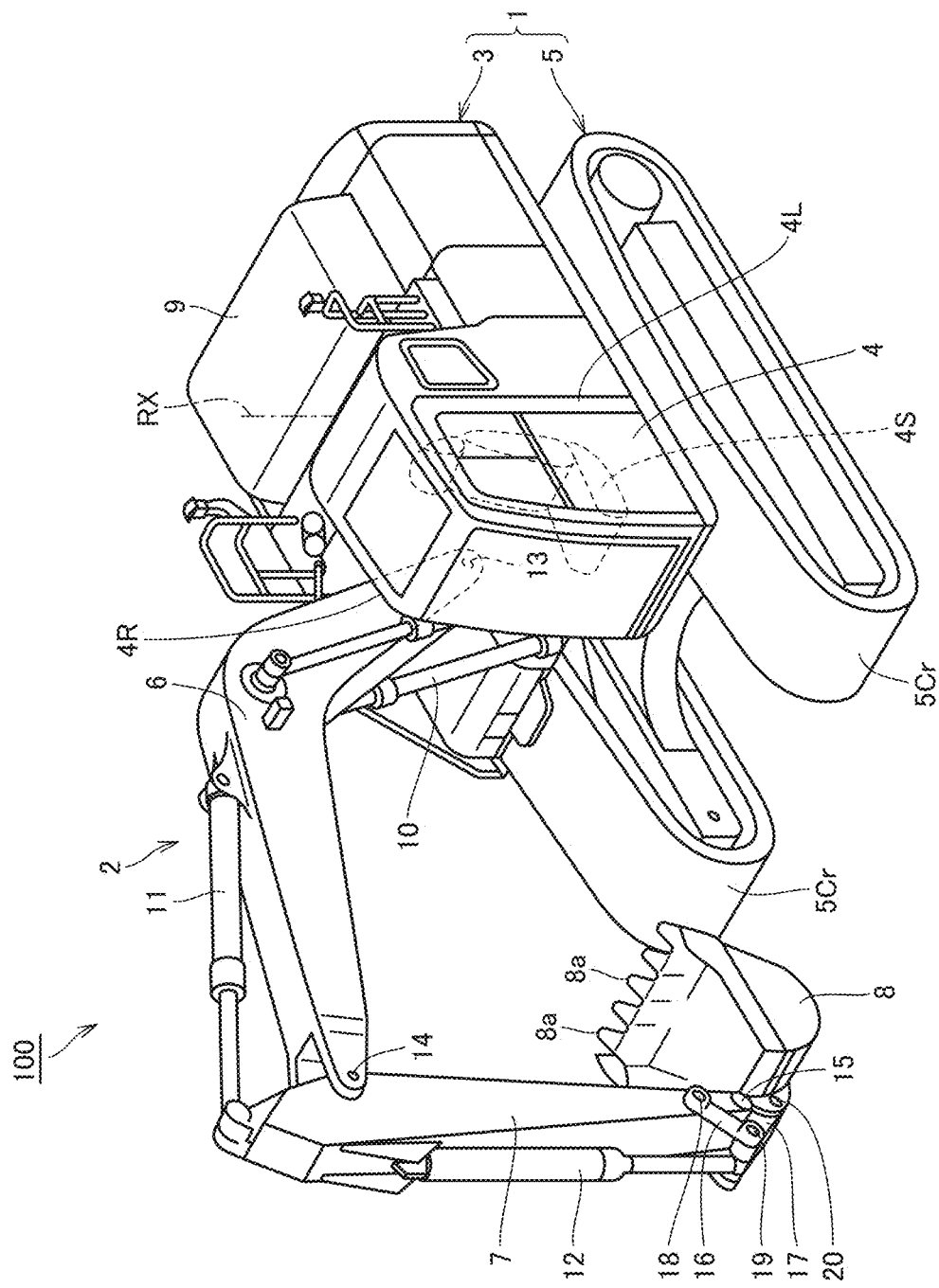
FIG. 1 is a perspective view illustrating a hydraulic excavator according to an embodiment.

Hereinafter, an embodiment will be described with reference to the drawings. In the following description, the same components having the same names and the same functions are denoted by the same reference numerals, and the detailed description thereof will not be repeated.

In the present embodiment, the description will be given on a hydraulic excavator which serves as an example of a work machine to which the concept of the present disclosure is applied. FIG. 1 is a perspective view illustrating a hydraulic excavator 100 according to an embodiment.

As illustrated in FIG. 1, the hydraulic excavator 100 includes a main body 1 and a work implement 2 operated by hydraulic pressure. The main body 1 includes a revolving unit 3 and a traveling unit 5. The traveling unit 5 is provided with a pair of crawler belts 5Cr. The hydraulic excavator 100 travels when the pair of crawler belts 5Cr rotate. The traveling unit 5 may be provided with wheels (tires) to replace the crawler belts 5Cr.

The revolving unit 3 is disposed on the traveling unit 5 and is supported by the traveling unit 5. The revolving unit 3 may resolve with respect to the traveling unit 5 about a revolution axis RX. The revolving unit 3 includes an engine compartment 9 in which an engine is accommodated, and a counterweight which is provided at a rear portion of the revolving unit 3. An engine and a hydraulic pump (not shown) are arranged in the engine compartment 9.

The revolving unit 3 includes a cab 4. An operator (a driver) of the hydraulic excavator 100 gets into the cab 4 to operate the hydraulic excavator 100. The cab 4 is provided with a driver's seat 4S on which the operator is seated. The operator in the cab 4 can operate the hydraulic excavator 100. The operator in the cab 4 can operate the work implement 2, revolve the revolving unit 3 relative to the traveling unit 5, and move the hydraulic excavator 100 by means of the traveling unit 5.

In the following description, the front-rear direction refers to a front direction and a rear direction of the operator seated on the driver's seat 4S in the cab 4. The direction facing the operator seated on the driver's seat 4S is defined as the front direction, and the direction backward the operator seated on the driver's seat 4S is defined as the rear direction. The left-right direction refers to a left direction and a right direction of the operator seated on the driver's seat 4S. When the operator seated on the driver's seat 4S faces the front, the right side and the left side of the operator are defined as the right direction and the left direction, respectively. The vertical direction refers to a direction orthogonal to a plane defined by the front-rear direction and the left-right direction. In the vertical direction, the side downward the ground is defined as a lower side, and the side upward the sky is defined as an upper side.

The work implement 2 is supported by the revolving unit 3. The work implement 2 includes a boom 6, an arm 7, and a bucket 8. The boom 6 is rotatably connected to the revolving unit 3. The arm 7 is rotatably connected to the boom 6. The bucket 8 is rotatably connected to the arm 7. The bucket 8 is provided with a plurality of teeth 8a.

The cab 4 has a first side face 4L and a second side face 4R facing each other. The second side face 4R of the cab 4 is located closer to the work implement 2 than the first side face 4L. In the present embodiment, the work implement 2 is arranged, for example, on the right side of the cab 4. Therefore, the first side face 4L of the cab 4 is, for example, the left side face, and the second side face 4R is, for example, the right side face.

The proximal end of the boom 6 is connected to the revolving unit 3 via a boom foot pin 13. The proximal end of the boom 6 is located on the opposite side to the first side face 4L relative to the second side face 4R of the cab 4. The proximal end of the arm 7 is connected to the distal end of the boom 6 via an arm pin 14. The bucket 8 is connected to the distal end of the arm 7 via a bucket pin 15.

The boom 6 is rotatable about the boom foot pin 13. The arm 7 is rotatable about the arm pin 14. The bucket 8 is rotatable about the bucket pin 15. The arm 7 and the bucket 8 are movable members at the distal end of the boom 6.

The work implement 2 includes a boom cylinder 10, an arm cylinder 11, and a bucket cylinder 12. The boom cylinder 10 is configured to drive the boom 6. The arm cylinder 11 is configured to drive the arm 7. The bucket cylinder 12 is configured to drive the bucket 8. Each of the boom cylinder 10, the arm cylinder 11 and the bucket cylinder 12 is a hydraulic cylinder driven by hydraulic oil.

The work implement 2 further includes a bucket link. The bucket link includes a first link member 16 and a second link member 17. The distal end of the first link member 16 and the distal end of the second link member 17 are rotatably connected to each other via a bucket cylinder top pin 19. The bucket cylinder top pin 19 is connected to the distal end of the bucket cylinder 12. Thus, the first link member 16 and the second link member 17 are connected to the bucket cylinder 12 via pin connection.

The proximal end of the first link member 16 is rotatably connected to the arm 7 via a first link pin 18 located near the bucket pin 15 at the distal end of the arm 7. Thus, the first link member 16 is connected to the arm 7 via pin connection. The proximal end of the second link member 17 is rotatably connected to a bracket disposed at a root portion of the bucket 8 via a second link pin 20. Thus, the second link member 17 is connected to the bucket 8 via pin connection.

Figure 2:
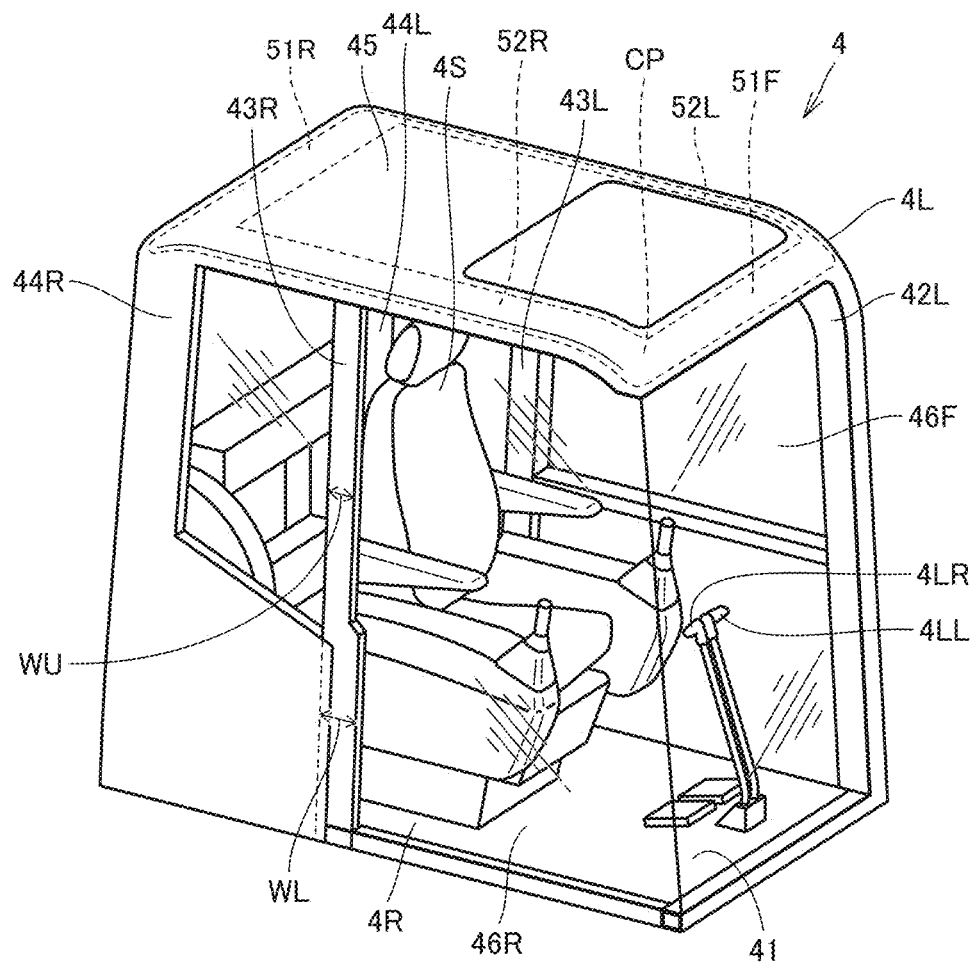
FIG. 2 is a perspective view illustrating a cab included in the hydraulic excavator illustrated in FIG. 1.
Figure 3:
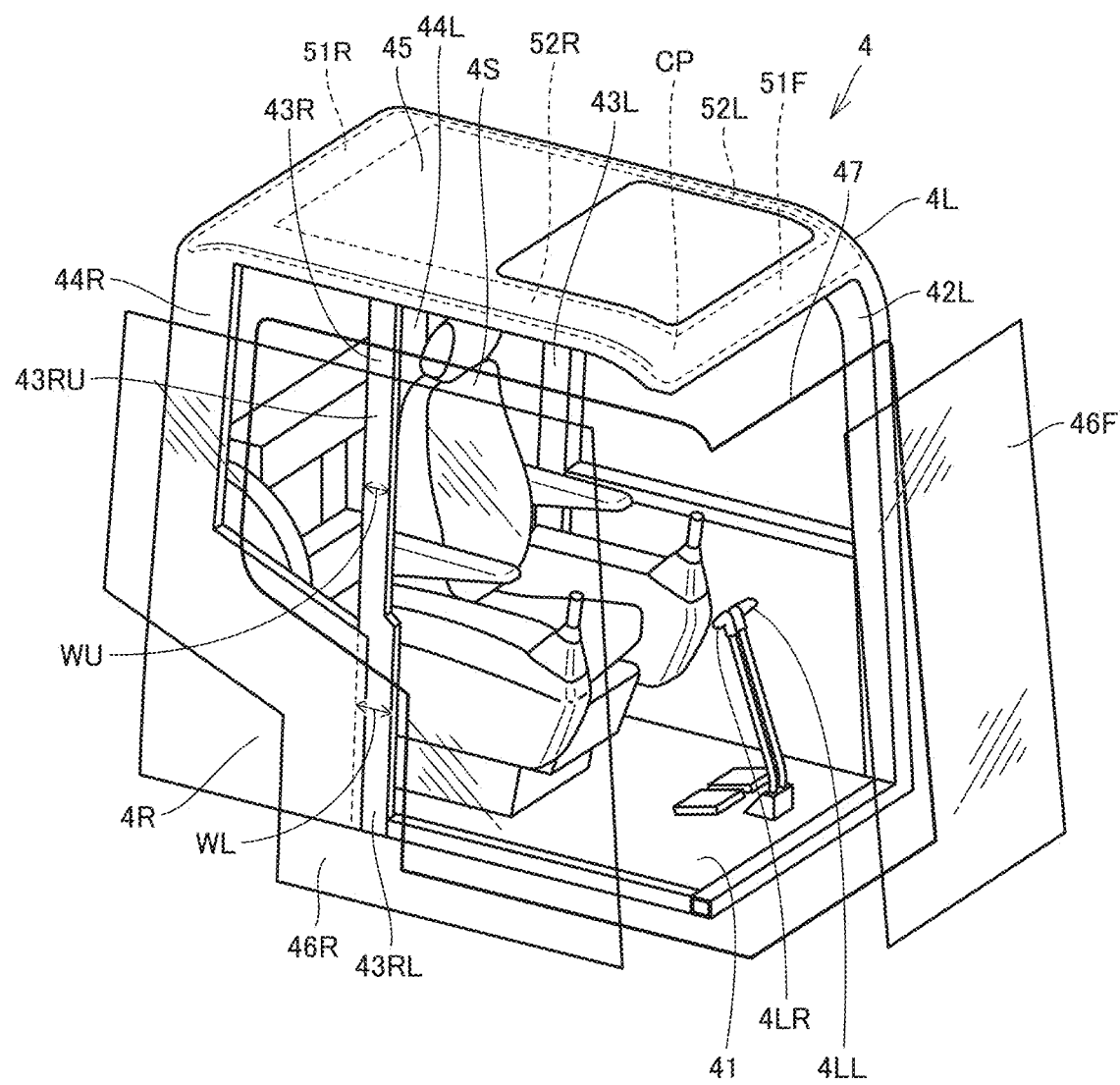
FIG. 3 is an exploded perspective view illustrating the cab of FIG. 2.

FIG. 2 is a perspective view illustrating a cab included in the hydraulic excavator illustrated in FIG. 1, and FIG. 3 is an exploded perspective view illustrating the cab of FIG. 2. As illustrated in FIG. 2, the cab 4 of the present embodiment mainly includes a floor member 41, a front pillar 42L (first front pillar), a front pillar 43R (second front pillar), a central pillar 43L, a pair of left and right rear pillars 44R and 44L, a pair of left and right beam members 51F and 51R, a pair of left and right frame members 52R and 52L, and a roof member 45.

The floor member 41 is arranged at the bottom of the cab 4. The floor member 41 is made of a flat plate. The pair of front pillars 42L and 43R, the central pillar 43L, and the pair of left and right rear pillars 44R and 44L are vertically arranged on the floor member 41. Each of these pillars 42L, 43R, 43L, 44R and 44L is connected to the floor member 41. Each of these pillars 42L, 43R, 43L, 44R and 44L is arranged such that the longitudinal length thereof extends in the vertical direction.

The front pillar 42L is disposed on the first side face 4L and connected to the floor member 41 at the front end of the first side face 4L. The central pillar 43L is disposed on the first side face 4L and located behind the front pillar 42L. The front pillar 43R is disposed on the second side face 4R and located behind the front pillar 42L. The front pillar 43R is disposed at a position opposite to the central pillar 43L in the left-right direction. A width WL of a lower portion of the front pillar 43R is larger than a width WU of an upper portion of the front pillar 43R.

The rear pillar 44L is disposed on the first side face 4L and located behind the central pillar 43L. The rear pillar 44R is disposed on the second side face 4R and located behind the front pillar 43R. The rear pillar 44R is disposed at a position opposite to the rear pillar 44L in the left-right direction. No additional pillar is disposed on the second side face 4R between the front pillar 43R and the rear pillar 44R, and no additional pillar is disposed on the second side face 4R in front of the front pillar 43R.

The beam member 51F is configured to extend in the left-right direction between the first side face 4L and the second side face 4R, and has a first end (left end) and a second end (right end) in the left-right direction. The first end of the beam member 51F is connected to the upper end of the front pillar 42L.

The beam member 51R is disposed behind the beam member 51F. The beam member 51R is configured to extend in the left-right direction between the first side face 4L and the second side face 4R, and has a third end (left end) and a fourth end (right end) in the left-right direction. The third end of the beam member 51R is connected to the upper end of the rear pillar 44L. The fourth end of the beam member 51R is connected to the upper end of the rear pillar 44R.

The frame member 52L is configured to extend in the front-rear direction along the first side face 4L. The frame member 52L is connected to the upper end of the front pillar 42L, the upper end of the central pillar 43L, and the upper end of the rear pillar 44L. The frame member 52L is connected to the first end of the beam member 51F on the side of the first side face 4L and the third end of the beam member 51R on the side of the first side face 4L.

The frame member 52R is configured to extend in the front-rear direction along the second side face 4R. The frame member 52R is connected to the upper end of the front pillar 43R and the upper end of the rear pillar 44R. The frame member 52R is connected to the second end of the beam member 51F on the side of the second side face 4R and the fourth end of the beam member 51R on the side of the second side face 4R.

The floor member 41, the pillars 42L, 43R, 43L, 44R and 44L, the beam members 51F and 51R, and the frame members 52L and 52R are joined together by welding, for example, to form a cab frame.

The cab 4 further includes a pair of travel control levers 4LL and 4LR. The pair of travel control levers 4LL and 4LR are operated by an operator seated on the driver's seat 4S to control the travel motion of the traveling unit 5. The pair of travel control levers 4LL and 4LR are disposed in front of the driver's seat 4S.

The driver's seat 4S and the pair of travel control levers 4LL and 4LR are all disposed inside the cab frame. The driver's seat 4S and the pair of travel control levers 4LL and 4LR are all disposed in a space surrounded by the floor member 41, the pillars 42L, 43R, 43L, 44R and 44L, the beam members 51F and 51R, and the frame members 52L and 52R.

The front pillar 42L is disposed in front of the driver's seat 4S. The front pillar 43R and the central pillar 43L are disposed on both sides of the driver's seat 4S, respectively. The pair of rear pillars 44R and 44L are disposed behind the driver's seat 4S on both sides, respectively.

The beam members 51F and 51R, the pair of left and right frame members 52R and 52L, and the roof member 45 are all disposed above the driver's seat 4S. The floor member 41 is disposed below the driver's seat 4S.

As illustrated in FIG. 3, the cab 4 further includes a front transparent member 46F, a lateral transparent member 46R, and a seal member 47. Each of the front transparent member 46F and the lateral transparent member 46R has a flat plate shape.

As illustrated in FIG. 2, the front transparent member 46F is disposed in front of the front pillar 43R and the central pillar 43L, and located in front of the driver's seat 4S. For example, the front transparent member 46F is disposed on the lateral side of the front pillar 42L and located between the first side face 4L and the second side face 4R. The front transparent member 46F is connected to the front pillar 42L. The front transparent member 46F is located between the beam member 51F and the front end of the floor member 41.

The lateral transparent member 46R is disposed on the second side face 4R. The lateral transparent member 46R is located in front of the rear pillar 44R and is configured to extend in the front-rear direction along the second side face 4R. The lateral transparent member 46R is disposed on the lateral side of the driver's seat 4S. The lateral transparent member 46R is located between the frame member 52R and a front end of the floor member 41 on the side of the second side face 4R. The lateral transparent member 46R is configured to extend from the front end of the floor member 41 rearward further than the front pillar 43R. However, the lateral transparent member 46R may be disposed only in front of the front pillar 43R. The lateral transparent member 46R is connected to the front pillar 43R on the second side face 4R. A seal member (not shown) may be disposed between the lateral transparent member 46R and the front pillar 43R. Alternately, an adhesive material or the like may be disposed between the lateral transparent member 46R and the front pillar 43R to replace the seal member.

Each of the front transparent member 46F and the lateral transparent member 46R is made of glass, for example. Each of the front transparent member 46F and the lateral transparent member 46R may be made of a transparent material such as acrylic resin other than glass.

As illustrated in FIG. 3, the seal member 47 is disposed to seal a gap between the cab frame and the front transparent member 46F and a gap between the cab frame and the lateral transparent member 46R. The seal member 47 is disposed between the front transparent member 46F and the beam member 51F, between the front transparent member 46F and the front pillar 42L, and between the front transparent member 46F and the floor member 41. The seal member 47 is disposed between the lateral transparent member 46R and the frame member 52R, between the lateral transparent member 46R and the rear pillar 44R, between the lateral transparent member 46R and the floor member 41, and the like. The seal member 47 is made of, for example, rubber. The seal member 47 may be an adhesive agent or the like other than rubber.

As illustrated in FIG. 2, no additional pillar is provided on the second side face 4R of the cab 4 in front of the front pillar 43R. Therefore, the cab 4 does not have a pillar to connect a connection portion CP between the beam member 51F and the frame member 52R to the floor member 41.

Figure 4:
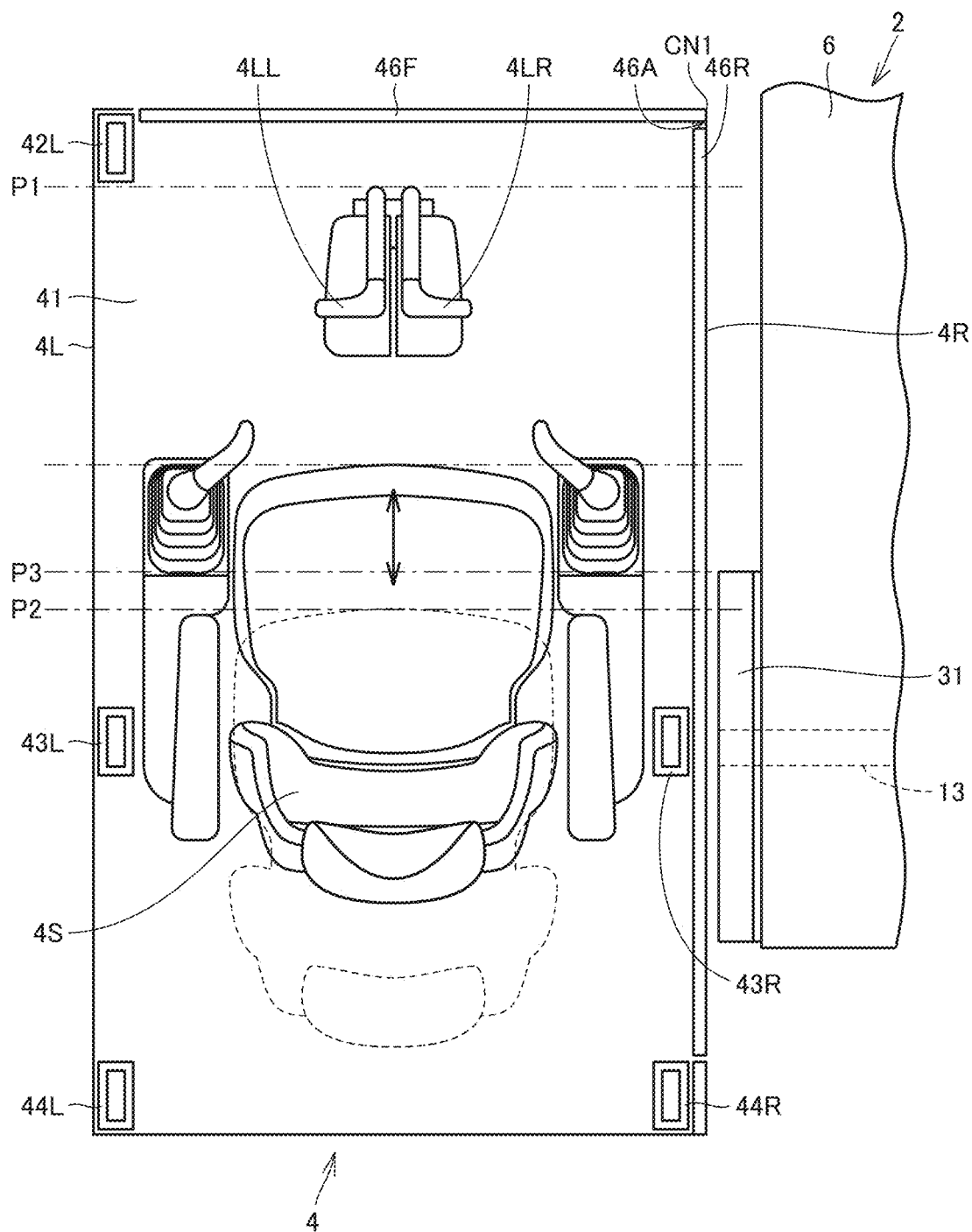
FIG. 4 is a plan view illustrating the internal configuration of the cab of FIG. 2 when viewed from a direction perpendicular to the floor surface.

FIG. 4 is a plan view illustrating the internal configuration of the cab of FIG. 2 when viewed from a direction perpendicular to the floor surface. As illustrated in FIG. 4, the pair of travel control levers 4LL and 4LR are disposed between the first side face 4L and the second side face 4R of the cab 4. The front pillar 42L is disposed on the first side face 4L relative to the pair of travel control levers 4LL and 4LR. The front pillar 43R is disposed on the second side face 4R relative to the pair of travel control levers 4LL and 4LR.

The cab 4 is provided with no additional pillar other than the front pillar 42L in front of a position P1 of the front end of the pair of travel control levers 4LL and 4LR. The front pillar 43R is located behind the front pillar 42L and behind the position P1 of the front end of the pair of travel control levers 4LL and 4LR. The position P1 of the front end of the pair of travel control levers 4LL and 4LR refers to the front end of the pair of travel control levers 4LL and 4LR when both are not operated by the operator.

The cab 4 is provided with no additional pillar other than the front pillar 42L in front of a position P2 of the front end of the driver's seat 4S. The front pillar 43R is located behind the position P2 of the front end of the driver's seat 4S. When the driver's seat 4S is slidable in the front-rear direction relative to the floor member 41, the position P2 of the front end of the driver's seat 4S means the front end of the driver's seat 4S when the driver's seat 4S is slid to a most rearward position (shown by a broken line) relative to the floor member 41.

The boom 6 of the work implement 2 is supported by the revolving unit 3 on the side of the second side face 4R of the cab 4 (for example, the right side). The revolving unit 3 is provided with a boom mounting bracket 31 (also referred to as a vertical plate) for supporting the boom 6. A boom foot pin 13 is inserted in the boom mounting bracket 31 and the boom 6. Thus, the boom 6 is attached to the boom mounting bracket 31 in such a manner that it is rotatable about the boom foot pin 13.

The boom mounting bracket 31 is disposed at a position in the left-right direction (for example, the right side) of the front pillar 43R. Specifically, the boom mounting bracket 31 is disposed on the opposite side to the first side face 4L of the cab 4 relative to the front pillar 43R. The boom mounting bracket 31 faces the front pillar 43R via a gap interposed therebetween. The cab 4 is provided with no additional pillar other than the front pillar 42L in front of a position P3 of the front end of the boom mounting bracket 31. The front pillar 43R is located behind the position P3 of the front end of the boom mounting bracket 31.

The front transparent member 46F and the lateral transparent member 46R are connected to each other through abutment connection. The front transparent member 46F and the lateral transparent member 46R abut against each other so as to be orthogonal to each other, for example. After the front transparent member 46F and the lateral transparent member 46R are made to abut against each other, a joining member 46A is provided at the abutting portion. The joining member 46A may be an adhesive material that bonds the front transparent member 46F and the lateral transparent member 46R to each other, or may be a sealing material such as rubber or the like provided between the front transparent member 46F and the lateral transparent member 46R.

The front transparent member 46F and the lateral transparent member 46R are joined by abutting against each other along the entire vertical length of each of the front transparent member 46F and the lateral transparent member 46R. In addition, the joining member 46A is provided at the abutting portion along the entire vertical length of each of the front transparent member 46F and the lateral transparent member 46R.

Note that the joining member 46A may not be provided at the abutting portion along the entire vertical length of each of the front transparent member 46F and the lateral transparent member 46R. The joining member 46A may be provided only at a part of the abutting portion, and the joining member 46A may not be provided at the other part of the abutting portion. For example, the joining member 46A may be provided only at one or both of the upper end and the lower end of the abutting portion, and may not be provided at the portion between the upper end and the lower end. In the abutting portion where the joining member 46A is not provided, the front transparent member 46F and the lateral transparent member 46R may be directly connected to each other.

The abutment of the front transparent member 46F and the lateral transparent member 46R constitute a corner CN1. The corner CN1 is a right-angle corner, for example. However, the corner CN1 is not limited to a right-angle corner, it may be an acute-angle corner or an obtuse-angle corner.

Figure 5:
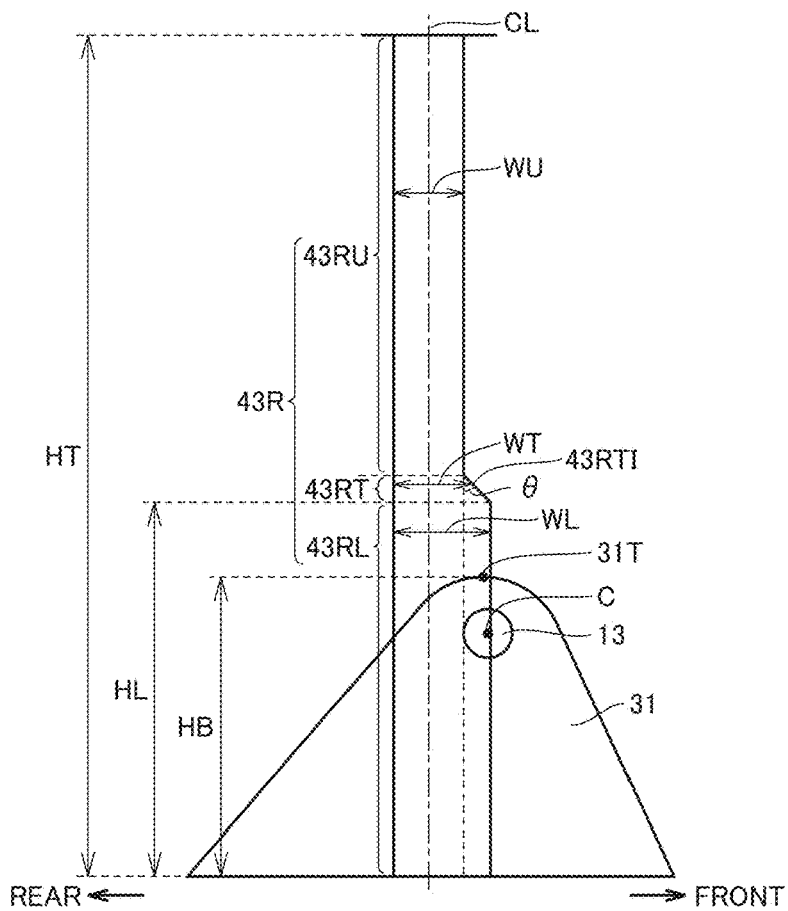
FIG. 5 is side view illustrating a front pillar 43R and a boom mounting bracket.
Figure 6:
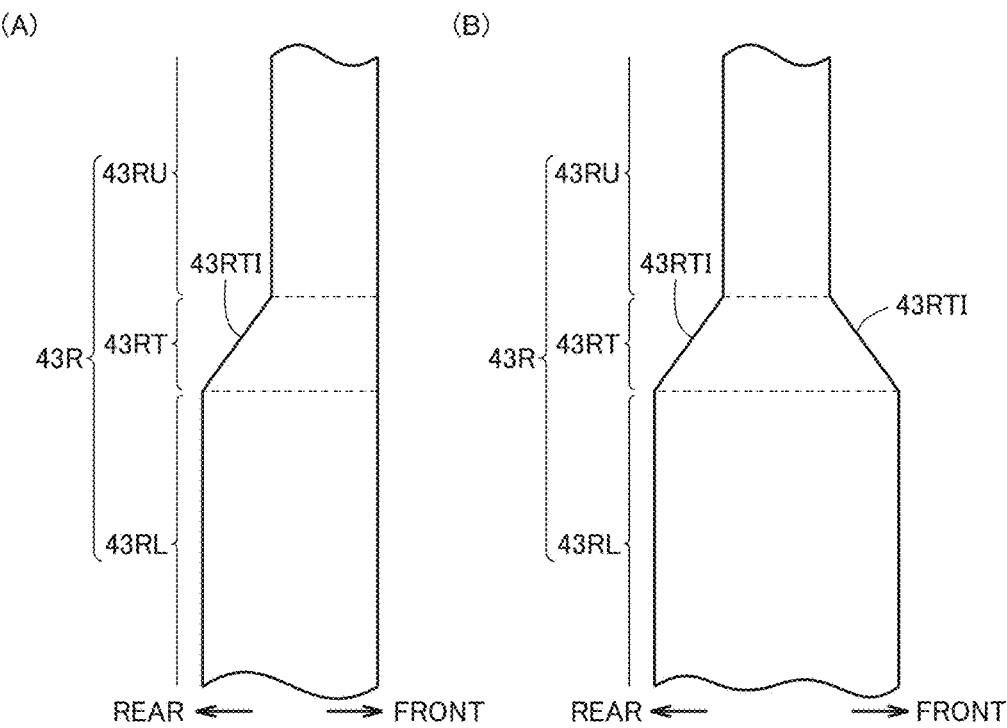
FIG. 6 is side view illustrating a modified example of the front pillar 43R.

FIG. 5 is side view illustrating the front pillar 43R and the boom mounting bracket. FIG. 6 is side view illustrating a modified example of the front pillar 43R.

As illustrated in FIG. 5, the front pillar 43R has an upper portion 43RU, a lower portion 43RL, and a tapered portion 43RT. The lower portion 43RL is located below the upper portion 43RU. The width WL of the lower portion 43RL in the front-rear direction is larger than the width WU of the upper portion 43RU in the front-rear direction. The width WL of the lower portion 43RL in the front-rear direction is preferably 1.5 times or more the width WU of the upper portion 43RU in the front-rear direction. The tapered portion 43RT is disposed between the upper portion 43RU and the lower portion 43RL.

The upper portion 43RU is configured to extend in the vertical direction with a constant width WU. The lower portion 43RL is configured to extend in the vertical direction with a constant width WL. The upper end of the tapered portion 43RT is connected to the upper portion 43RU, and the lower end of the tapered portion 43RT is connected to the lower portion 43RL.

The tapered portion 43RT has an inclined portion 43RTI, the width WT of which increases downward in the vertical direction in side view. The upper end of the inclined portion 43RTI is connected to the upper portion 43RU, and the lower end of the inclined portion 43RTI is connected to the lower portion 43RLI. The inclination angle θ of the inclined portion 43RTI relative to the vertical direction where the front pillar 43R extends is equal to or less than 45°.

The side view refers to such a view that is viewed from the left-right direction of the operator seated on the driver's seat 4S. The vertical direction where the front pillar 43R extends refers to the direction where the front pillar 43R extends vertically when viewed by the operator seated on the driver's seat 4S.

An uppermost portion 31T of the boom mounting bracket 31 is located below the lower end of the tapered portion 43RT. The boom mounting bracket 31 is disposed so as to overlap with the front pillar 43R in side view. The uppermost portion 31T of the boom mounting bracket 31 is disposed at a position overlapping with the front pillar 43R in side view.

In side view, the uppermost portion 31T of the boom mounting bracket 31 is located right above the boom foot pin 13.

The vertical length HL of the lower portion 43RL of the front pillar 43R is preferably 40% or more of the vertical length HT of the front pillar 43R. The vertical length HB along which the boom mounting bracket 31 and the front pillar 43R overlap each other in side view is preferably 50% or less of the vertical length HT of the front pillar 43R.

In side view, the position of a center C of the boom foot pin 13 may be deviated in the front-rear direction from a center line CL passing through a center position of the upper portion 43RD in the front-rear direction. In this case, the inclined portion 43RTI of the tapered portion 43RT is preferably disposed on the same side as the center C of the boom foot pin 13 deviated from the center line CL.

For example, when the center C of the boom foot pin 13 is deviated from the center line CL to the front side in side view, the inclined portion 43RTI is preferably disposed on the front side of the tapered portion 43RT. On the other hand, when the center C of the boom foot pin 13 is deviated from the center line CL to the rear side in side view, as illustrated in FIG. 6(A), the inclined portion 43RTI is preferably disposed on the rear side of the tapered portion 43RT. As illustrated in FIG. 6B, the inclined portions 43RTI may be disposed on both the front side and the rear side of the tapered portion 43RT.

Figure 7:
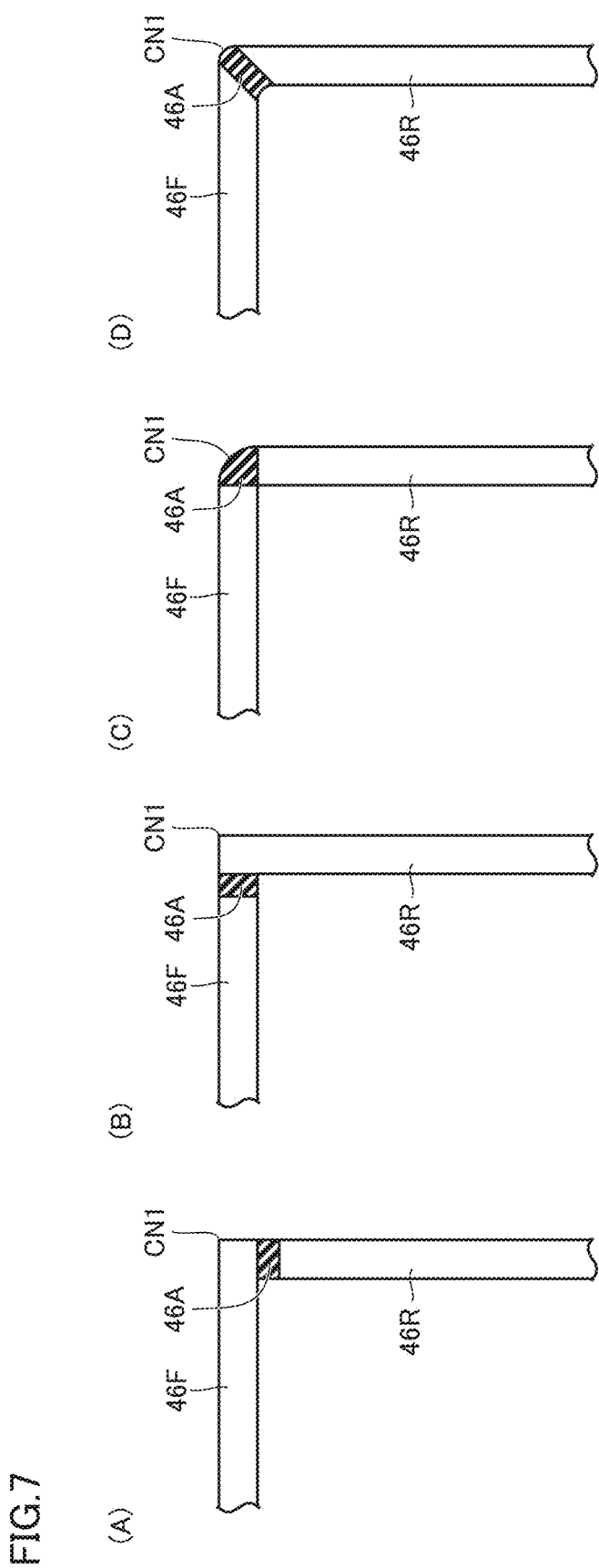
FIGS. 7A to 7D are diagrams illustrating different abutment states.

FIGS. 7A to 7D are diagrams illustrating different states in which the front transparent member 46F and the lateral transparent member 46R abut against each other. As illustrated in FIG. 7A, the joining member 46A may be provided between the rear end face of the front transparent member 46F and the front end face of the lateral transparent member 46R. In this case, the corner CN1 constituted by the front transparent member 46F and the lateral transparent member 46R is formed by the corner of the front transparent member 46F.

As illustrated in FIG. 7B, the joining member 46A may be provided between the side end face of the front transparent member 46F facing the second side face 4R and the surface of the lateral transparent member 46R facing the first side face 4L. In this case, the corner CN1 constituted by the front transparent member 46F and the lateral transparent member 46R is formed by the corner of the lateral transparent member 46R.

As illustrated in FIG. 7C, the joining member 46A may be provided between the side end face of the front transparent member 46F facing the second side face 4R and the front end face of the lateral transparent member 46R.

As illustrated in FIG. 7D, a first slope may be provided on the side end face of the front transparent member 46F facing the second side face 4R, a second slope may be provided on the front end face of the lateral transparent member 46R, and the joining member 46A may be disposed between the first slope and the second slope.

Figure 8:
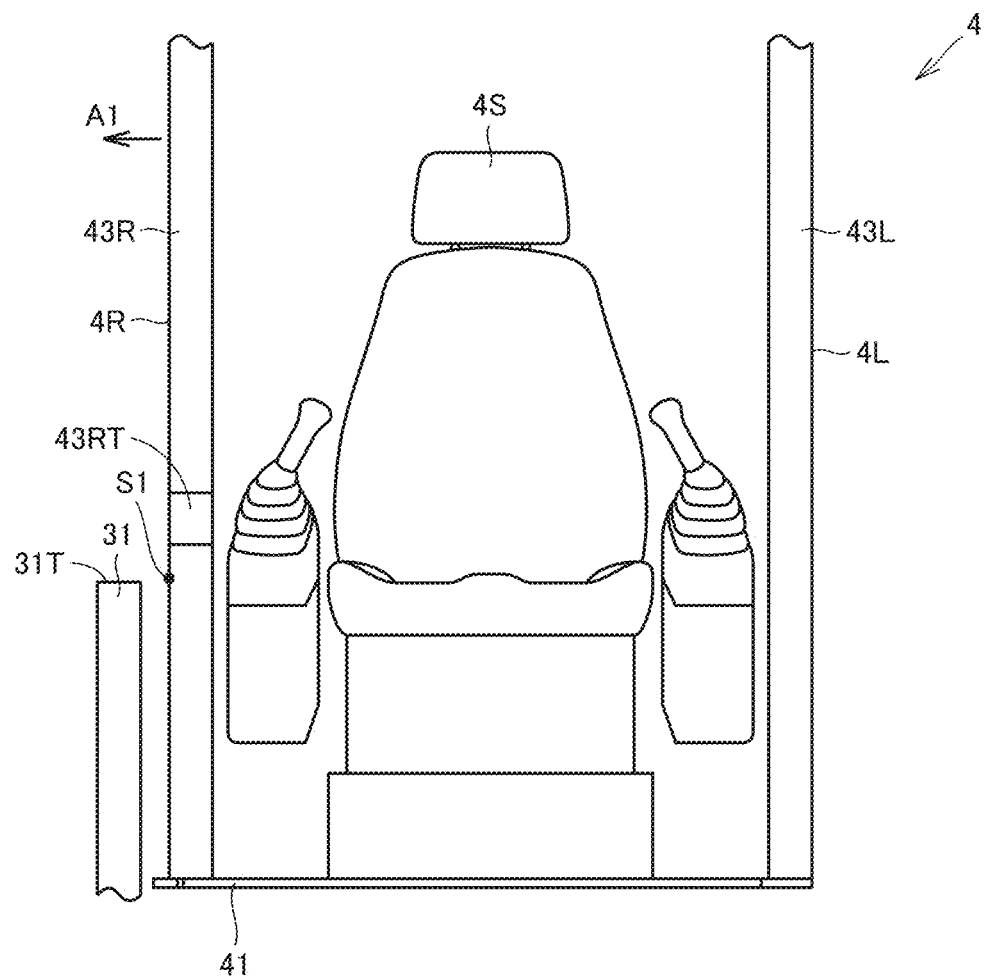
FIG. 8 is a view illustrating a relationship between the pillars and a boom mounting bracket provided in the cab of FIG. 2.

FIG. 8 is a view illustrating a relationship between the pillars and the boom mounting bracket in the cab of FIG. 2. As illustrated in FIG. 8, the boom mounting bracket 31 is disposed on the opposite side to the first side face 4L relative to the front pillar 43R. The boom mounting bracket 31 faces the front pillar 43R with a gap interposed therebetween in the left-right direction. The front pillar 43R extends upward beyond the upper end of the boom mounting bracket 31.

Next, the effects of the present embodiment will be described.

As illustrated in FIG. 1, in the work machine 100 of the present embodiment, the second side face 4R is disposed closer to the work implement 2 than the first side face 4L of the cab 4. Therefore, in order to allow the operator in the cab 4 to monitor the operation by the work implement 2, it is particularly important to ensure the front visibility including the oblique front visibility toward the second side face 4R of the cab 4 in the visual field of the operator.

Figure 9:
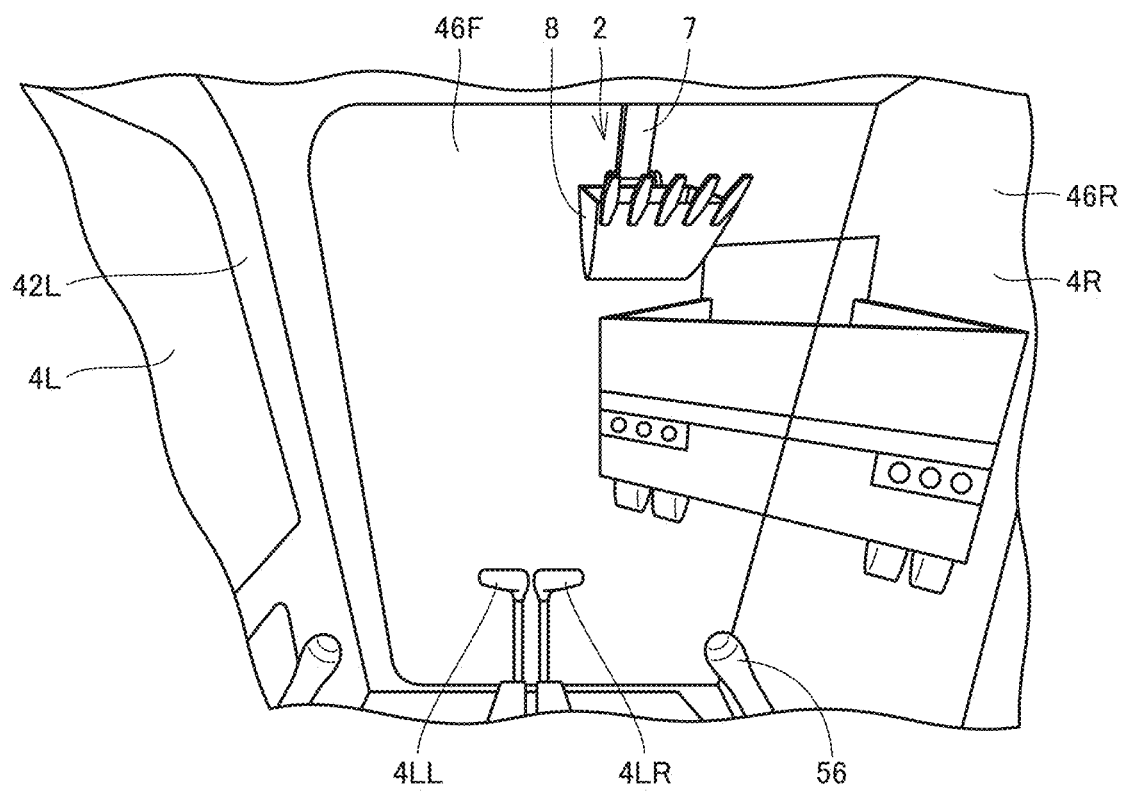
FIG. 9 is a view illustrating a front visual field of an operator seated on a driver's seat in the cab illustrated in FIG. 1.

As illustrated in FIG. 4, in the present embodiment, the front pillar 43R disposed on the second side face 4R is located behind the front pillar 42L. Thus, as illustrated in FIG. 9, it is possible to improve the front visibility the operator in the cab 4 toward the second side face 4R. Further, since the work implement 2 is disposed on the side of the second side face 4R of the cab 4, it is easy for the operator to clearly monitor the work implement 2 so as to enhance the workability of the work implement 2.

As illustrated in FIG. 8, the boom mounting bracket 31 is disposed so as to overlap with the front pillar 43R in side view. Thus, when the hydraulic excavator 100 is subjected to a large load from the lateral side and accordingly the front pillar 43R tilts in the direction indicated by an arrow A1, a portion S1 of the front pillar 43R abuts against the boom mounting bracket 31. Thus, the front pillar 43R is prevented from tilting in the direction indicated by the arrow A1, whereby the cab 4 is prevented from tilting in the direction indicated by the arrow A1.

As described above, according to the work machine 100 of the present embodiment, it is possible to prevent the cab from tilting when subjected to a large load from the lateral side and improve the front visibility of the operator in the cab 4 so as to enhance the workability.

FIG. 9 illustrates an example work to be performed by the work implement 2 in which the work implement 2 transfers the loads in the bucket 8 to the vessel of a dump truck. As illustrated in FIG. 9, the operator seated on the driver's seat 4S can clearly monitor the bucket 8 of the work implement 2 and the vessel of the dump truck in the visual field.

According to the work machine 100 of the present embodiment, as illustrated in FIG. 5, the tapered portion 43RT includes an inclined portion 43RTI, the width WT of which increases downward in the vertical direction in side view. The inclined portion 43RTI joins together the upper portion 43RD and the lower portion 43RL having different widths.

According to the work machine 100 of the present embodiment, as illustrated in FIG. 5, the uppermost portion 31T of the boom mounting bracket 31 is located below the lower end of the tapered portion 43RT. Thus, even when the front pillar 43R tilts in the direction indicated by the arrow A1 in FIG. 8, the lower portion 43RL having the large width WL abuts against the boom mounting bracket 31. Therefore, the front pillar 43R is prevented from bending at the abut portion S1 with the boom mounting bracket 31, whereby it is possible to prevent the front pillar 43R from tilting.

According to the work machine 100 of the present embodiment, as illustrated in FIG. 5, the uppermost portion 31T of the boom mounting bracket 31 is disposed at a position overlapping with the front pillar 43R in side view. Thus, even when the front pillar 43R tilts in the direction indicated by the arrow A1 in FIG. 8, the front pillar 43R abuts against the uppermost portion 31T at the highest position of the boom mounting bracket 31, whereby it is possible to prevent the front pillar 43R from tilting.

According to the work machine 100 of the present embodiment, as illustrated in FIG. 5, the uppermost portion 31T of the boom mounting bracket 31 is located right above the boom foot pin 13 in side view. Thus, when the front pillar 43R tilts in the direction indicated by the arrow A1 in FIG. 8 and abuts against the boom mounting bracket 31, the boom mounting bracket 31 is prevented from tilting together with the front pillar 43R by the boom foot pin 13, whereby it is possible to prevent the front pillar 43R from tilting.

According to the work machine 100 of the present embodiment, as illustrated in FIG. 5, the inclined portion 43RTI of the tapered portion 43RT is disposed on the same side as the center C of the boom foot pin 13 deviated from the center line CL in side view. Thus, when the front pillar 43R tilts in the direction indicated by the arrow A1 in FIG. 8, the front pillar 43R abuts against the upper end of the boom mounting bracket 31 located directly above the boom foot pin 13. Therefore, as described above, the boom mounting bracket 31 is prevented from tilting together with the front pillar 43R by the boom foot pin 13, whereby it is possible to prevent the front pillar 43R from tilting.

According to the work machine 100 of the present embodiment, as illustrated in FIG. 5, the vertical length HL of the lower portion 43RL of the front pillar 43R is preferably 40% or more of the vertical length HT of the front pillar 43R. Accordingly, the ratio of the lower portion 43RL having a large width WL to the entire length of the front pillar 43R increases, which makes it possible to increase the strength of the front pillar 43R.

According to the work machine 100 of the present embodiment, as illustrated in FIG. 5, the inclination angle θ of the inclined portion 43RTI relative to the vertical direction where the front pillar 43R extends is equal to or less than 45°. Since the inclination angle is as small as 45° or less, the stress is prevented from being concentrated at the joint between the inclination portion 43RTI and the other portions. Therefore, the front pillar 43R is prevented from being bent or broken by the stress.

According to the cab 4 of the present embodiment, as illustrated in FIG. 5, the width WL of the lower portion 43RL in the front-rear direction is 1.5 times or more the width WU of the upper portion 43RU in the front-rear direction. Since the width WU of the upper portion 43RU is smaller, it is possible to improve the front visibility of the operator. Further, since the width WL of the lower portion 43RL is larger, it is possible to increase the strength of the cab 4.

According to the work machine 100 of the present embodiment, as illustrated in FIG. 4, the front transparent member 46F and the lateral transparent member 46R are joined by abutting against each other. No additional member such as a pillar is disposed at the abutting portion between the front transparent member 46F and the lateral transparent member 46R. Therefore, as illustrated in FIG. 9, the blind spot in the visual field of the operator in the cab 4 including the oblique front of the second side face 4R is reduced. Thus, it is possible to improve the front visibility of the operator in the cab 4 including the oblique front visibility toward the second side face 4R, which makes it possible to enhance the workability of the work implement 2.

According to the work machine 100 of the present embodiment, as illustrated in FIG. 4, the front pillar 43R is located behind the position P1 of the front ends of the travel control levers 4LL and 4LR. Thus, it is possible to improve the front visibility of the operator including the oblique front visibility toward the second side face 4R, which makes it possible to enhance the workability of the work implement 2.

According to the work machine 100 of the present embodiment, as illustrated in FIG. 4, the front pillar 43R is located behind the position P2 of the front end of the driver's seat 4S. Thus, as described above, it is possible to improve the front visibility of the operator including the oblique front visibility toward the second side face 4R, which makes it possible to further enhance the workability of the work implement 2.

According to the work machine 100 of the present embodiment, as illustrated in FIG. 6, the front pillar 43R of the cab 4 is located behind the position P3 of the front end of the boom mounting bracket 31. Thus, as described above, it is possible to improve the front visibility of the operator including the oblique front visibility toward the second side face 4R, which makes it possible to further enhance the workability of the work implement 2.

The work implement 2 may be disposed in front of the cab 4. Specifically, the work implement 2 may be attached to the main body 1 (for example, the revolving unit 3) in front of the cab 4. Also in this case, since the front visibility of the operator including the oblique front visibility toward the second side face 4R is improved, the workability of the work implement 2 is enhanced.

Although in the above embodiment, it is described that the work implement 2 is disposed on the right side of the cab 4, the work implement 2 may be disposed on the left side of the cab 4. In this case, the left side face of the cab 4 is located closer to the work implement 2 than the right side face. Accordingly, the front pillar on the left side face of the cab 4 may be disposed behind the front pillar on the right side face.

Although a hydraulic excavator has been described above as an example of a work machine to which the concept of the present disclosure is applied, the work machine may be a crane, a wheel loader, a motor grader or the like, or the work machine may have a crusher, a breaker or the like to replace the bucket 8.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1: main body; 2: work implement; 3: revolving unit; 4: cab; 4L: first side face; 4LL, 4LR: travel control lever; 4R: second side face; 4S: driver's seat; 5: traveling unit; 5Cr: crawler belt; 6: boom; 7: arm; 8: bucket; 8a: tooth; 9: engine compartment; 10: boom cylinder; 11: arm cylinder; 12: bucket cylinder; 13: boom foot pin; 14: arm pin; 15: bucket pin; 16: first link member; 17: second link member; 18: first link pin; 19: bucket cylinder top pin; 20: second link pin; 31: boom mounting bracket; 31T: uppermost portion; 41: floor member; 41a: first portion; 41b: second portion; 42L, 43R: front pillar; 43RL: lower portion; 43RT: tapered portion; 43RTI: inclined portion; 43RD: upper portion; 43L: central pillar; 44L, 44R: rear pillar; 45: roof member; 46A: joining member; 46F: front transparent member; 46R: lateral transparent member; 47: seal member; 51F, 51R: beam member; 52L, 52R: frame member; 55: base portion; 100: work machine (hydraulic excavator); C: center; CN1, CN2: corner; CP: connection portion; GA: gap; P1, P2, P3: position; RX: pivot axis; S1: portion; S2: portion

The invention claimed is:

1. A work machine comprising:
a work implement;
a bracket that supports the work implement; and
a cab which has a first side face and a second side face facing the first side face in a left-right direction and located closer to the work implement,
the cab including:
a first front pillar disposed on the first side face;
a central pillar disposed on the first side face and located behind the first front pillar in the front-rear direction orthogonal to the left-right direction; and
a second front pillar disposed on the second side face and located behind the first front pillar, and
the bracket and the second front pillar overlapping each other in a side view that is viewed from the left-right direction.

2. The work machine according to claim 1, wherein
the second front pillar includes an upper portion, a lower portion having a width larger than a width of the upper portion in the front-rear direction, and a tapered portion located between the upper portion and the lower portion, and
the tapered portion includes an inclined portion, the width of which increases downward in the vertical direction in the side view.

3. The work machine according to claim 2, wherein
an uppermost portion of the bracket is located below a lower end of the tapered portion.

4. The work machine according to claim 3, wherein
the uppermost portion of the bracket and the second front pillar overlap each other in the side view.

5. The work machine according to claim 4, wherein
the work machine further includes a pin inserted through both the bracket and the work implement, and
the uppermost portion of the bracket is located right above the pin in the side view.

6. The work machine according to claim 5, wherein
the pin is deviated in the front-rear direction from a center line passing through a center position of the upper portion in the front-rear direction in the side view, and
the inclined portion included in the tapered portion is disposed on the same side as the pin deviated from the center line.

7. The work machine according to claim 2, wherein
the vertical length of the lower portion is 40% or more of the vertical length of the second front pillar.

8. The work machine according to claim 1, wherein
the vertical length along which the bracket and the second front pillar overlap each other in the side view is 50% or less of the vertical length of the second front pillar.

9. The work machine according to claim 2, wherein
an inclination angle of the inclined portion relative to the vertical direction where the second front pillar extends is 45° or less.

10. The work machine according to claim 2, wherein
the width of the lower portion in the front-rear direction is 1.5 times or more the width of the upper portion in the front-rear direction.

11. The work machine according to claim 1, wherein
the second front pillar is located behind a front end of the bracket.

12. The work machine according to claim 1, wherein
the cab does not include a pillar disposed on the second side face in front of the second front pillar.

* * * * *